April 20, 1937.  G. D. KING  2,078,198
SET STABILIZED GYPSUM PLASTER
Filed Oct. 2, 1936  2 Sheets-Sheet 1
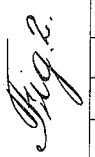
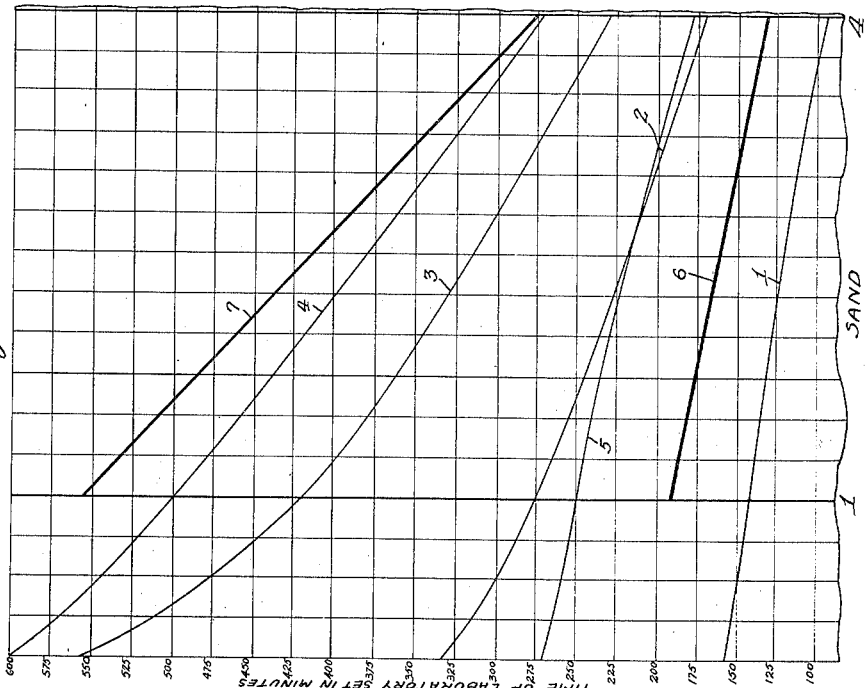
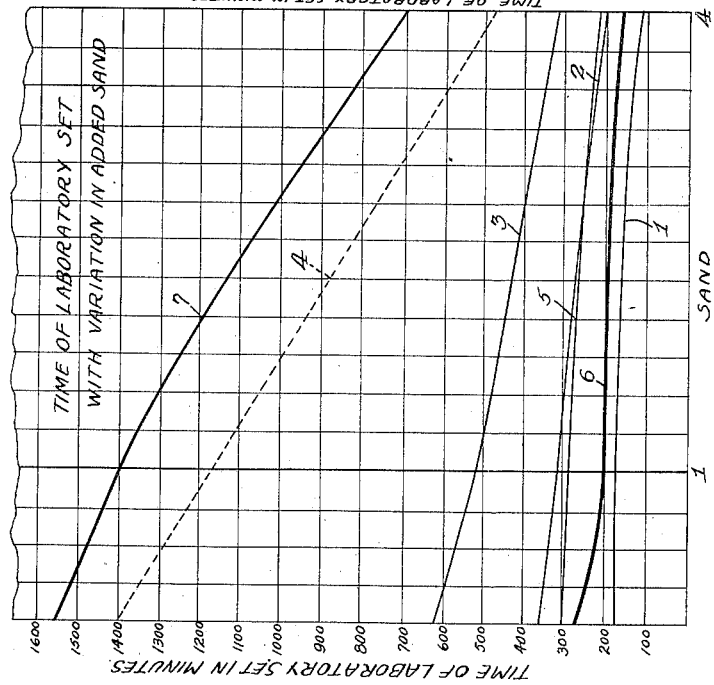
Inventor.
George D. King.
By Jones, Addington, Ames & Seibold
Attys.

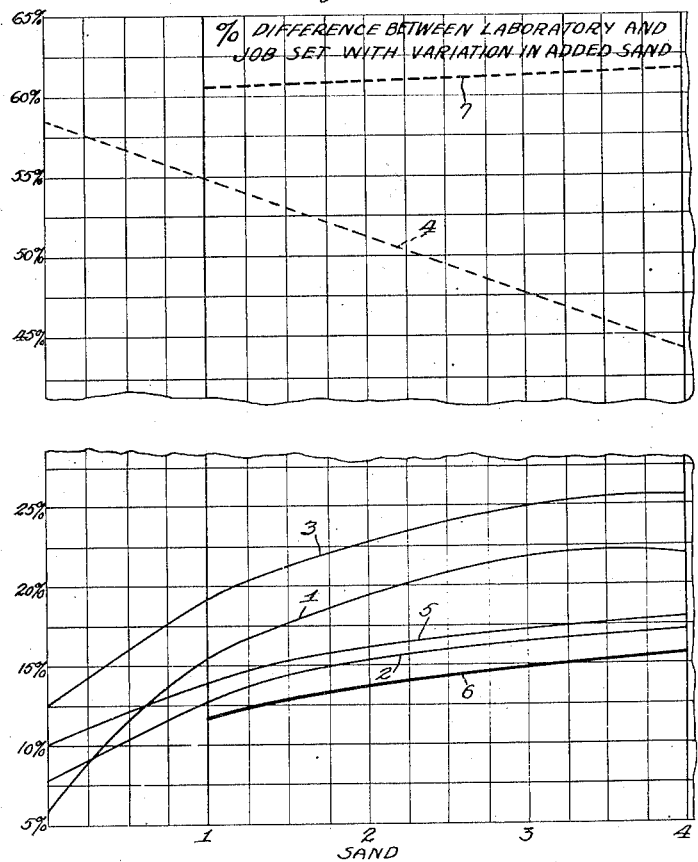

Patented Apr. 20, 1937

2,078,198

UNITED STATES PATENT OFFICE 2,078,198

SET-STABILIZED GYPSUM PLASTER

George D. King, Chicago, Ill., assignor to United States Gypsum Company, Chicago, Ill., a corporation of Illinois Application October 2, 1936, Serial No. 103,654

6 Claims. (Cl. 106—34)

The present invention relates to a process of stabilizing the setting time of calcium sulfate hemihydrate cements and plasters against the influence of adventitious admixtures of substances which may have either an accelerating or a retarding influence.

One of the primary objects of the present invention is to produce a calcium sulfate hemihydrate cement or plaster to which there have been added accelerating as well as retarding materials in such proportions that the subsequent adventitious admixture of accelerating or retarding influences will be without any material effect upon the setting time of the plaster, so that it may properly be called a "set-stabilized" plaster. It is in this sense that the term "set-stabilized" will be used in the further description of the present invention.

A further object of the invention is to admix calcium sulfate hemihydrate cement or plaster such, for example, as calcined gypsum with certain quantities of extremely finely ground natural of raw gypsum (calcium sulfate dihydrate) and commercial retarders of the type already well known in the gypsum industry, the finely ground gypsum and the retarder being so proportioned as to result in a set-stabilized cement or plaster.

The main object to be attained by the present invention is to enable the production of a set-stabilized calcined gypsum plaster by means of ingredients which are readily available in the gypsum industry and which, because of their low price, are particularly advantageous from a commercial standpoint.

It has already been proposed to produce set-stabilized gypsum plaster by mixing with the plaster, ground set plaster (calcium sulphate dihydrate) or to produce, in a mixture of calcined gypsum and water, seed crystals of calcium sulfate dihydrate by metathesis, as for example by the precipitation of calcium sulfate crystals from lime and aluminum sulfate, or alum, there also being present sufficient quantities of retarder to offset the accelerating effect of the added crystal-forming material.

Thus, for example, the use of calcium sulfate dihydrate seed crystals with a sufficient amount of retarder to offset their accelerating effect has been broadly disclosed in the prior art, but in connection with these proposed processes there has invariably been used calcium sulfate dihydrate in a crystal form which was derived from material which had once been calcined, then mixed with water and allowed to set. It was believed up to the present time that the seed crystals of the calcium sulfate dihydrate added to a calcined gypsum slurry had to be crystals which were of exactly the same crystallographic character as the crystals which formed as a result of the setting of the gypsum. It was believed that raw or natural gypsum rock could not be used as an accelerating or set-stabilizing agent but that such crystal-forming characteristics inhered only in calcium sulfate dihydrate crystals which had been formed from the hemihydrate by hydration. Thus, it has been proposed to mix ground, set gypsum and a retarder with calcium sulfate hemihydrate plasters in order to produce a set-stabilized plaster. In practicing such a process, set gypsum would be pulverized to about 100 to 200 mesh and then mixed with the calcined gypsum, a retarder also being added to offset the accelerating effect of the crystal-forming material. As an alternative, preformed calcium sulfate dihydrate crystals would be mixed with the retarding material and the mixture ground to from 100 to 200 mesh and then added to the bulk of the calcium sulfate hemihydrate plaster so as to produce a set-stabilized plaster.

In accordance with the present invention, however, instead of employing set calcium sulfate dihydrate, the inventor employs very finely ground natural calcium sulfate—that is to say, natural gypsum, which is also known in the industry as "land plaster." Land plaster is merely ground natural gypsum rock to which the name "land plaster" has been given because of its use in fertilizer or soil conditioning agents. The inventor has discovered that if natural gypsum or land plaster be pulverized very finely, that is to say, to a point where it will contain a fairly large percentage—say, about 25% or more—of natural gypsum particles the size of which is about 25 microns, or smaller, it may be employed together with the retarder as an addition to calcium sulfate hemihydrate plasters and cements for the purpose of producing a set-stabilized product.

The degree of grinding of the natural gypsum used for this purpose is of paramount importance, and, as will be pointed out hereinbelow, this grinding must be carried out to such a degree that the ground product will contain about 25% of particles which are less than 25 microns in diameter. A product thus finely ground is far finer than any ground gypsum product hitherto proposed for this purpose. In the prior art the set-stabilizing crystal-forming calcium sulfate dihydrate material has been on the order of from 100 to 200 mesh and even, in some instances, as low as 350 mesh. It should be noted, however, at this point, that a 350 mesh material is still considerably coarser than 25 microns. As will be shown in connection with the drawings and in the tables hereinbelow reproduced, the particle size of the natural gypsum is of great importance, and the invention is therefore, in essence, predicated upon the discovery that the use of particles of suitable size will accomplish successful results.

In the drawings accompanying this specification—

Fig. 1 is a graph showing the time of set, in minutes, of various kinds of gypsum cement plasters to which there have been added various materials to stabilize the set;

Fig. 2 is a similar graph to Fig. 1 except that it is predicated upon the job set; while Fig. 3 is a chart comparing the percentage differences between the laboratory and job sets, with variations in added sand and with variations in the material which has been added to the cement plaster.

Neat gypsum plaster as ordinarily manufactured will, on hydration, set in approximately 20 to 30 minutes. This speed of set, however, is much too rapid for the convenient use of the plaster craftsmen, especially when sand (which accelerates the set) is added to the plaster, as is the usual custom. For commercial purposes it is necessary to adjust a plaster so that it will have a normal setting time of from 2½ to 6 hours. Thus, ample time must be given to the craftsmen to prepare the plaster mix and to apply it to the receiving base in uniform thickness and in a workmanlike manner before it sets, stiffens, and becomes unworkable. Conversely, a plaster having a too long setting time will exhibit a tendency to dry before the hydration and setting process and as a result of such drying will produce a weak and soft wall or product. The natural short setting time of neat plaster is increased by the addition to the plaster of powdered nitrogenous glue-like materials which in commercial practice are obtained by treating keratinaceous materials such as hoofs, hides, hair, etc., with caustic soda and quicklime. The material resulting from this treatment is commercially known as "retarder" and is added by gypsum plaster manufacturers at their plants in such quantities as to yield a product which ordinarily has a setting time varying from two hours to six hours. Other retarders may be used, such as powdered animal glue, acetates, citrates, timothy hay extract, etc.

Even though the set of the retarded plaster is adjusted at the plant to meet certain specifications of the plastering trade, the treated product must be sent to various markets where different job conditions are encountered. Varying amounts of sand are also added to the plaster. The sand is a mild seeding agent and when used in appreciable quantities has an accelerating effect upon the setting of the plaster. Furthermore, in commercial practice where successive batches of plaster are mixed in mixing boxes and the like it has hitherto been necessary to clean carefully such boxes and the tools used for mixing the plaster, so as to remove therefrom all material which might have remained from the previous operation. The reason for this was that the set plaster is a direct accelerator and may very well shorten the setting time of the freshly mixed batch to a point where it will set before the workman has had an opportunity to apply it to the wall or ceiling. Therefore it becomes necessary to add to plasters a comparatively large amount of a seeding agent which, of course, acts as an accelerating material, and also a comparatively large amount of retarding agent to overcome the accelerating effect of the seeding agent. When a plaster is thus made, any subsequent adventitious admixture of either an accelerating or a retarding material will exert virtually no influence upon the setting time of gypsum plaster or cement, because it has already been accelerated as well as retarded to the maximum extent. This adjustment of the plaster, or its "set stabilization," has already been described in the past but never with the use of natural or raw gypsum, particularly natural or raw gypsum in a state of subdivision where a substantial amount of particles of a size of 25 microns or less were present.

Compared with "set" gypsum, natural gypsum is a very dense material in which the individual crystals are usually very large. The grinding of the natural gypsum results in the formation of large crystals or portions of crystals, of irregular fracture and shape. However, when gypsum hemihydrate is gaged with water and allowed to set, it forms an inherently soft, porous, set mass consisting of myriads of interlaced, comparatively small crystals. When such set gypsum is dried and pulverized, it forms relatively smaller particles, either more porous or very small crystals or portions of the small acicular crystals. As the natural gypsum and set gypsum do not form pulverized particles of the same size, shape, porosity, or degree of crystal formation, it could not have been expected that natural gypsum, with retarder, would have set stabilizing influence when added to a freshly gaged calcium sulfate hemihydrate slurry.

For the purpose of the present invention and as an exemplification thereof, the inventor has used finely ground land plaster or raw gypsum having a screen analysis about as follows:

|  | Per cent |
|---|---|
| Through 100 mesh | 99.96 |
| Through 200 mesh | 99.91 |
| Through 325 mesh (44 microns) | 99.64 |
| Smaller than 10 microns | 27.00 |

Employing a ground raw gypsum of the above screen analysis, commercial batches of set stabilized plaster were prepared according to the following formula:

|  | Pounds avoirdupois |
|---|---|
| Calcium sulfate hemihydrate (calcined gypsum) | 2000 |
| Commercial retarder | 6 to 12 |
| Finely ground raw gypsum | 8 to 40 |
| Sand | 0 to 10,000 |

For the purpose of showing the unexpected effect of the particle size of the raw gypsum upon the set-stabilizing properties thereof, carefully conducted tests were made, employing finely ground gypsum which had been very accurately air-separated into definite fractions, which were as follows:

(1) Particles of a size smaller than 10 microns.
(2) Particles of a size larger than 10 microns but smaller than 25 microns.
(3) Particles of a size larger than 25 microns but smaller than 44 microns.
(4) Particles of a size larger than 44 microns.

From the above fractions a special mixture was prepared, which consisted of:

|  | Pounds |
|---|---|
| Calcium sulfate hemihydrate | 2000 |
| Retarder | 8 |
| Ground gypsum fraction | 10 |
| Sand | 0 to 10,000 |

From each of these fractions a mixture was made up in the above proportions, and this mixture was then diluted with sand, in the proportions of, by weight, no sand, an equal amount of sand, and four times the amount of sand. Setting tests were then run on the mixtures thus prepared under clean, laboratory conditions ordinarily known as "clean set" and also under job conditions ordinarily designated as "job set" or "board set".

As a comparison, a fifth set of samples was run, corresponding to a plaster which had been stabilized by finely ground, set gypsum (calcium sulfate dihydrate). The material run in a sixth set was the commercial material made in accordance with the preferred form of the present invention, while as a seventh set, for the purpose of comparison, a plaster which had not been set-stabilized was also run. In the subjoined Tables I and II, the various columns have the following significance: The first column represents the fraction used in making the mixture; the second column, the amount of plaster employed; the third column, the amount of sand employed. The fourth column, marked "A", is the laboratory set in minutes; the fifth column, marked "B", is the job set in minutes; the sixth column, marked "C", is the difference between the laboratory set and the job set in minutes; and the seventh column is the percentage difference between the job and laboratory sets—that is to say, it is C divided by A. In Table I there are compared, in the order named, fractions 1, 2, 3 and 4, and the reground set gypsum of the prior art. In Table II there are compared, as item 6, the preferred formula of the present invention and, as item 7, the ordinary non-set stabilized plaster of commerce.

*Table I*

|  | Plaster | Sand | A<br>Lab. set | B<br>Job set | C<br>Difference | $\frac{C}{A}$ |
|---|---|---|---|---|---|---|
|  |  |  | Min. | Min. | Min. |  |
| Fraction 1 | 1 | 0 | 170 | 160 | 10 | 5.9 |
|  | 1 | 1 | 165 | 140 | 25 | 15.1 |
|  | 1 | 4 | 115 | 90 | 25 | 21.7 |
| Fraction 2 | 1 | 0 | 360 | 335 | 25 | 6.9 |
|  | 1 | 1 | 315 | 275 | 40 | 12.7 |
|  | 1 | 4 | 205 | 170 | 35 | 17.1 |
| Fraction 3 | 1 | 0 | 640 | 560 | 80 | 12.5 |
|  | 1 | 1 | 520 | 420 | 100 | 19.3 |
|  | 1 | 4 | 310 | 230 | 80 | 25.8 |
| Fraction 4 | 1 | 0 | 1,440 | 600 | 840 | 58.3 |
|  | 1 | 1 | not tested |  |  |  |
|  | 1 | 4 | 480 | 270 | 210 | 43.7 |
| 5<br>Reground set gypsum (for comparison). | 1 | 0 | 300 | 270 | 30 | 10.0 |
|  | 1 | 1 | 290 | 250 | 40 | 13.8 |
|  | 1 | 4 | 220 | 180 | 40 | 18.2 |

*Table II*

*Improved plaster (using raw dihydrate ground to contain about 25% of −25 micron particles)*

Calcined gypsum (hemihydrate)____ 2,000 pounds
Retarder_____ 8 pounds
Ground raw gypsum (dihydrate)____ 10 pounds

|  | Plaster | Sand | A<br>Lab. set | B<br>Job set | C<br>Difference | $\frac{C}{A}$ |
|---|---|---|---|---|---|---|
|  |  |  | Min. | Min. | Min. |  |
| 6<br>Preferred formula. | 1 | 0 | 270 |  |  |  |
|  | 1 | 1 | 215 | 190 | 25 | 11.6 |
|  | 1 | 4 | 160 | 135 | 25 | 15.6 |
| 7<br>(Non set-stabilized plaster). | 1 | 0 | 1,560 |  |  |  |
|  | 1 | 1 | 1,410 | 555 | 855 | 60.7 |
|  | 1 | 4 | 700 | 270 | 430 | 61.4 |

As will be seen from these tables, the greatest amount of set stabilization was attained with the commercial mixture, or item 6 in the table, the next best being that mixture made with Fraction 2, which, as above stated, consisted of particles which were larger than 10 microns but smaller than 25. In the commercial mixture, of course, there were particles larger than 25 microns and also smaller than 25 microns, and that is why the commercial mixture (item 6) is just about intermediate between Fraction 1 and Fraction 3.

In order to emphasize the marked differences between the fractions differing in particle size, there have been prepared, and submitted in the form of the drawings herewith, three graphs which show in visual form the differences to be found between the materials enumerated in Table I and Table II.

Referring to Fig. 1, this visualizes the time of the laboratory or clean set with variations in added sand. The vertical component is expressed in minutes while the horizontal component corresponds to the amount of added sand—none, 1 part, or 4 parts. As will be seen from Fig. 1, the lowermost line thereon represents the change in setting time, under laboratory conditions, of the experimental mixture made with Fraction 1, containing particles smaller than 10 microns in size. Without any added sand, the setting time of this material was 170 minutes. With 1 part of sand it was 165 minutes, and with 4 parts of sand it was 115 minutes. Fraction 2 had a setting time of 360 minutes without sand, 315 minutes with 1 part of sand, and 205 minutes with 4 parts of sand. Fraction 3, containing particles larger than 25 microns, had a setting time of 640 minutes without sand, 520 minutes with 1 part of sand, and 310 minutes with 4 parts of sand. It will be noticed at once that the stabilizing effect of the natural gypsum, when the particles are larger than 25 microns, has to a great extent disappeared; but when the fourth fraction is reached, when the particles are larger than 44 microns, the difference is truly startling. As will be seen from line 4 (Fig. 1), which corresponds to the fourth fraction, the setting time of the mixture was 1440 minutes with no sand and 480 minutes with 4 parts of sand. This clearly demonstrates that without sand the material had virtually no effect on the setting time, while when sand was added the setting time was drastically reduced and no stabilization attained. Line 7 in Fig. 1 refers to ordinary plaster which has not been set-stabilized, and it will be noticed that this has a setting time of 1560 minutes without sand, 1410 minutes with 1 part of sand, and 700 minutes with 4 parts of sand. Thus the mixture containing Fraction 4 was almost as bad from the viewpoint of set-stabilization as plaster which had not been treated at all, while the material which was treated with Fractions 1 and 2, and with the commercial mixture, yielded a graph which is almost a horizontal line, showing but very slight decrease in setting time as a result of the admixture of the sand. In Fig. 1, the line corresponding to the preferred formula is line 6, and this will be seen to lie intermediately between the first and the second fraction. Attention is also directed to line 5, Fig. 1, which corresponds to the comparative test made with reground set gypsum, which is the prior art set-stabilizing material. It will be noticed that this, without sand, falls between the preferred formula (line 6) of the present invention and Fraction 2 but that with 4 parts of sand added it falls above Fraction 2.

Referring to Fig. 2, the vertical component is the time of the job set expressed in minutes, and the horizontal component corresponds to the amount of sand added. Thus Figs. 1 and 2 are comparable except that they are on a somewhat different scale, the highest part of the graph in Fig. 1 being 1600 minutes while the highest graph in Fig. 2 is 600 minutes. The startling differences between the various fractions are particularly well brought out in Fig. 2. Thus Fraction 1 without sand has a setting time of 160 minutes, while with 1 part of sand it sets in 140 minutes and with 4 parts in 90 minutes. The preferred formula (line 6) with 1 part of sand sets in 190 minutes and with 4 parts of sand sets in 135 minutes, while Fraction 2 without sand sets in 335 minutes, with 1 part of sand in 275 minutes and with 4 parts in 170 minutes. Line 5, which corresponds to the prior art set-stabilizing method, using ground set gypsum, is seen also to cross line 2, as it does in Fig. 1. Where the particle size, however, is larger, as in Fraction 3, the line becomes much steeper, starting at 560 minutes for Fraction 3 without sand and dropping to 230 minutes for the same fraction with 4 parts of sand. Fraction 4 exhibits virtually no set-stabilizing powers and is virtually parallel with the untreated plaster in line 7.

Referring to Fig. 3, this is predicated upon the seventh column of Table I and Table II, being a numerical expression of the differences between the laboratory or clean set and the job set, expressed in the ratio of $$\frac{C}{A}$$

The numbers on the lines have the same significance as in Figs. 1 and 2. Thus in Fig. 3 it will at once become apparent that line 6, representing the preferred formula compounded in accordance with the present invention, gives the greatest set stabilization, the difference between the laboratory and the job set in the case of 1 part of sand and 4 parts of sand being very slight. In other words, the effect of the sand upon the setting time is very slight. It will be noticed that the difference in setting time is 25 minutes in each case. The setting time with the larger amount of sand is somewhat less in the laboratory as well as on the job, but all differences remain the same. The percentage difference is, of course, somewhat greater in the last case, but this is simply due to the fact that the setting time itself has a lower numerical value which will increase the value of the ratio. In this respect the preferred formula (line 6) is most similar to Fraction 2, which is constituted of particles between 10 and 25 microns in size. It is also quite comparable to the effect obtained by means of ground pre-set gypsum, which is line 5. In the case of line 1, which is the first fraction, the particles being smaller than 10 microns, it will be noticed that this is not quite as good as the preferred formula, possibly because the particles then are a little too small and suffer some solution. Fraction 3, which contains particles larger than 25 microns, shows considerable difference between "no sand" and "4 parts of sand," while Fraction 4 is so entirely different that the line actually takes the reverse slant. Line 7, which is that of ordinary plaster, shows an enormous setting time, although the percentage of decrease in job over clean conditions is approximately the same. Reference should therefore be had to Table II, where the great difference between 1 part and 4 parts of sand will be seen. Thus, with 1 part of sand on the job this material set in 555 minutes, while with 4 parts of sand the setting time dropped to 270 minutes. This difference is best seen in Figs. 1 and 2.

In summarizing the conclusions to be drawn from the examination of the tables and the graphs, it will be seen that by the use of natural gypsum, ground so that the greater percentage of the material is of a size of about 25 microns and less, a set-stabilizing effect is obtained which is strictly comparable to that obtained with ground calcined and pre-set gypsum, but that when the gypsum is ground so that the particles are larger than 25 microns little, if any, set stabilization can be obtained.

The present invention is not limited to the use of a carefully selected or sifted ground gypsum. The main point to be observed is that the material added should contain a fair proportion, say about 25%, of particles of a size of 25 microns or less. If there should be particles larger than that, they would have little effect one way or the other. Thus the invention would be carried out by using a smaller amount of land plaster containing a large percentage of minus 25 micron particles, or a larger amount of land plaster containing a relatively small percentage of minus 25 micron particles.

In compounding the material in accordance with the preferred or other formulas, this can be done with any suitable mixing machine and is preferably carried out at temperatures well below the calcination point of the raw gypsum added. It would be inadvisable to add the finely ground raw gypsum to a batch shortly after it is removed from the calcining kettles. The addition should be made at the time when the gypsum has cooled to a little above the ambient temperature.

In the claims, the term "set-stabilized" is used in the sense that the material is stabilized against disturbances in the setting time by adventitious admixture or accelerating and retarding influences.

I claim:

1. A set-stabilized gypsum cement plaster comprising about 2000 pounds of calcium sulfate hemihydrate, retarder to give the desired delayed time of set, not more than about 40 pounds of raw gypsum ground so that about 25% or more thereof is of a size of 25 microns or less, and sufficient additional retarder to counteract the accelerating effect of the raw gypsum.

2. A set-stabilized gypsum cement plaster comprising calcium sulfate hemihydrate, retarder to give the desired delayed time of set, raw gypsum comminuted to a fineness of less than 25 microns in a quantity of at least 2½ pounds to each 2000 pounds of the hemihydrate, and sufficient additional retarder to counteract the accelerating effect of the raw gypsum.

3. A set-stabilized gypsum plaster which comprises calcined calcium sulfate as the setting ingredient and about 1 to 1½ parts per thousand of finely pulverized raw natural gypsum (dihydrate), the state of comminution of which is such that its particles measure 25 microns or less in maximum diameter.

4. The process of set stabilizing a gypsum cement plaster which comprises accelerating a retarded calcium sulfate hemihydrate plaster by means of raw gypsum ground to a particle size not substantially greater than 25 microns diameter which is added in an amount of at least 2½ pounds per ton of hemihydrate, and then retarding the original set by the addition of further quantities of commercial gypsum retarder.

5. The process of set stabilizing calcined gypsum plaster which comprises adding thereto balanced amounts of retarder and accelerating material, the latter consisting of raw natural gypsum, in an amount of not substantially greater than about 40 pounds per ton of calcined gypsum, in such a state of comminution that it will contain not less than about 25% of particles having a diameter of 25 microns or less.

6. A set-stabilized gypsum plaster comprising calcium sulfate hemihydrate, a retarder to give the desired delayed time of set, and a finely divided raw gypsum ground to particle sizes not substantially greater than 25 microns diameter, said finely divided raw gypsum being present to the extent of approximately 0.125% to approximately 0.5% of the amount of the calcium sulfate hemihydrate employed.

GEORGE D. KING.